PROCESS FOR THE MANUFACTURE OF HIGHLY DISPERSE SOLIDS CONSISTING OF CROSSLINKED UREA-FORMALDEHYDE POLYCONDENSATION PRODUCTS

REFERENCE TO PRIOR APPLICATIONS

This application is a continuation of application Ser. No. 439,243, filed Feb. 4, 1974 (now abandoned) which application is in turn a continuation-in-part of application Ser. No. 378,898 filed July 13, 1973 (now abandoned), which application is in turn a continuation of application Ser. No. 299,479 filed Oct. 20, 1972 (now abandoned), the latter application being a continuation of application Ser. No. 65,330 filed Aug. 19, 1970 (now abandoned).

In Applicant's prior application Ser. No. 807,926, filed Mar. 17, 1969 (now abandoned), there is disclosed a process for the manufacture of highly disperse solids of crosslinked urea-formaldehyde polycondensation products, consisting of approximately spherical particles with an average diameter of less than 1000A, which is characterized in that the aqueous solution of a precondensate of urea and formaldehyde is converted into a crosslinked gel in the presence of a protective colloid by adding sulphamic acid or a water-soluble ammonium hydrogen sulphate of general formula $$[R-NH_3]^+ [SO_4H]^-$$

wherein R denotes a hydrogen atom or an organic radical which does not impair the solubility in water, such as especially an alkyl, cycloalkyl, hydroxyalkyl, aralkyl or aryl radical, with the molar ratio of formaldehyde:urea being greater than 1 not later than at the time of formation of the gel, and that the resulting gel is comminuted, dried and deagglomerated.

The products of the process, which consist of approximately spherical, only slighlty agglomerated primary particles with diameters of less than 1000A, are suitable for the reinforcement of elastomers, such as natural rubber or synthetic elastomers.

It has now been found that disperse products consisting of crosslinked urea-formaldehyde polycondensation product, having interesting technical properties, are also obtained if the process of the prior application is carried out analogously in all respects except that a protective colloid is absent.

The products obtained according to this modified process of the present application are more highly agglomerated to sintered together, as distinct from the products which are manufactured according to the process of the prior application, and consist of primary particles of average size ≦ 1 micron. Such products are for example very suitable for use as white pigments especially for paper, in mass as well as in surface application, as carrier materials for agricultural chemicals, and for effluent purification.

The subject of the present invention is therefore a process for the manufacture of highly disperse solids of crosslinked urea-formaldehyde polycondensation products consisting of primary particles with an average diameter not greater than 1 micron, characterized in that an aqueous solution which consists essentially of water and a precondensate of urea and formaldehyde, i.e., one which does not contain a protective colloid or other modifying agent, is converted into a crosslinked gel by adding sulphamic acid or a water-soluble ammonium hydrogen sulphate of the formula $$[R-NH_3]^+ [SO_4H]^- \quad (I)$$

wherein R denotes a hydrogen atom or an organic radical which does not impair the solubility in water, such as especially an alkyl, cycloalkyl, hydroxyalkyl, aralkyl or aryl radical, with the molar ratio of formaldehyde:urea being greater than 1.2 not later than at the time of formation of the gel, and that the resulting gel is comminuted, dried and deagglomerated.

If desired, a precondensate of urea and less than the total requisite amount of $CH_2O$ (for example 1 mol of $CH_2O$ per 1 mol of urea) can be manufactured, and the remaining amount of formaldehyde only added during the subsequent gelling.

Appropriately, however, more than 1.2 mols, and preferably about 1.5 mols, of formaldehyde per 1 mol of urea are already used in the manufacture of the precondensate. The use of more than 2 mols of formaldehyde per 1 mol of urea, whilst not inoperative, is however uneconomical. The use of above a molar ratio of 2 may also be disadvantageous by resulting in pollution of the effluent from the process due to a high formaldehyde content therein.

The precondensate is appropriately manufactured in the pH range of between 6 and 9 and in the temperature range of between 40° and 100° C. The reaction time should appropriately be so long that the bulk of the formaldehyde (approximately 90%) has the opportunity to react with the urea, but not so long that the water tolerance of the precondensate becomes so low that it is no longer possible to mix it homogeneously with the acid solution. Relatively high temperatures and relatively low pH values lead to the desired degree of polycondensation within a shorter time.

The gel formation is brought about by mixing the precondensate with a solution of amidosulphonic acid or of optionally substituted ammonium hydrogen sulphates at temperatures of between room temperature and 100° C. If the acid strength and temperature are correctly chosen, the gel formation starts within a few seconds. Provision must, therefore, be made for an intensive mixing of precondensate and acid solution within a short time. A continuous mixing of the two solutions is here particularly appropriate. The gel formation is slightly exothermic — but the heat capacity of the reaction mixture easily suffices to absorb the heat of reaction under adiabatic conditions, this heat of reaction generally causing a temperature rise of 10° – 15° C.

Examples of optionally substituted ammonium hydrogen sulphates of formula (1) are, in addition to $NH_4^+ \cdot HSO_4^-$; $CH_3-NH_3^+ \cdot HSO_4^-$; $C_2H_5NH_3^+ \cdot HSO_4^-$; $HO-CH_2-CH_2-NH_3^+ \cdot HSO_4^-$;

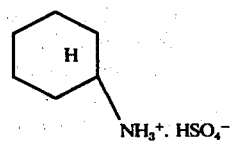 and 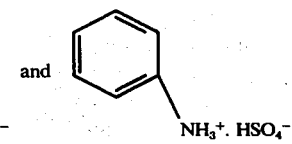

Where the basicity of the amine component is too great, some excess sulphuric acid is appropriately added to the ammonium salt solution.

Despite its high water content, the gel is dimensionally stable. It is easy to comminute, for example, by means of a cutting granulator. The comminuted gel should appropriately be freed of at least the bulk of the acid catalyst by washing with water and/or by treatment with alkali. As a rule, the procedure followed in working up is that after the comminution the gel is neutralized in aqueous suspension, then filtered off or centrifuged off and, where appropriate, washed to remove inorganic salt. After drying and cooling, the solid infusible and insoluble polycondensation product is deagglomerated by means of a pin mill or jet mill. Following deagglomeration the product can be subjected to a classifying operation, e.g., an air classification, whereby the particularly desired product can be obtained and subsequently packaged.

As used herein the term "insoluble" means that the products are not soluble in the conventional organic polymer solvents such as for example alcohols, ethers, ketones, hydrocarbons and the like. The products of the invention melt only under conditions of decomposition and are thus designated herein as "infusible".

Apart from being suitable for use as pigments, carriers or adsorbents, the products obtained according to the process of the invention are also suitable for use as reinforcing fillers for elastomers, such as natural rubber or synthetic rubber.

In the examples which follow, parts denote parts by weight and percentages denote percentages by weight.

EXAMPLE 1

750 parts of 30% strength aqueous formaldehyde solution are adjusted to pH = 7.5 with dilute sodium hydroxide solution and warmed to 70° C. 300 parts of urea are added and condensation carried out for 3 hours at pH = 7.5 and 70° C.

The precondensate solution thus obtained is cooled to 30° C and rapidly mixed with a solution of 16 parts of sulphamic acid in 100 parts of water, which has also been warmed to 30° C. The gel formation starts rapidly, and the temperature rises to approximately 60° C (concentration at which gelling occurs: 45%). The gel is left for 3 hours at this temperature, comminuted in a cutting granulator, suspended in a 1–2 fold amount of water, and neutralized with a 10% strength aqueous solution of $Na_2CO_3$; the product is then filtered off, washed, dried at 110° C for 24 hours in a stream of air and ground, after cooling, in a high speed pin mill. 382 parts (corresponding to a yield of 1.27 kg per 1 kg of urea employed) of a free-flowing white powder having the following properties are obtained:

| | |
|---|---|
| Specific surface area | 60.7 m²/g |
| Bulk density | 143 g/liter |
| molar ratio F/U | 1.45 |

EXAMPLES 2–4

Exactly the same procedure as in Example 1 is followed except that condensation is carried out in a more highly diluted aqueous solution by in each case further adding to the mixture of 300 parts of urea and 750 parts of 30% strength aqueous $CH_2O$ solution the amounts of water indicated in the following table. The yields and properties of the free-flowing powders obtained are also noted in the table below:

Table I

| EXAMPLE | Amount of H₂O added, parts | Concentration on gelling % | Yield Parts | Yield Kg/per 1 kg of urea | Specific surface area m²/g | Bulk density g/liter | Mean particle size (primary particles) d | Molar ratio F/U of the product |
|---|---|---|---|---|---|---|---|---|
| 2 | 583.5 | 30 | 367 | 1.22 | 24.2 | 51 | 0.17μ | 1.33 |
| 3 | 334.5 | 35 | 375 | 1.25 | 38.2 | 71 | 0.11μ | 1.37 |
| 4 | 146.5 | 40 | 379 | 1.26 | 48.2 | 100 | 0.90μ | 1.42 |

The pH-values at the beginning of the gel formation and at the end of the gel formation have been determined in each Example. These pH-values are given in Table II.

TABLE II

| EXAMPLE NO. | gel Concentration % | pH at the beginning of the gel formation (30° C) | pH at the end of the gel formation (50° C) |
|---|---|---|---|
| 1 | 45 | 1.2 | 1 |
| 2 | 30 | 1.6 | 1.4 |
| 3 | 35 | 1.55 | 1.35 |
| 4 | 40 | 1.45 | 1.3 |

What is claimed is:

1. A process for the manufacture of highly disperse insoluble and infusible solids of crosslinked urea-formaldehyde polycondensation products consisting of primary particles having an average diameter of not greater than 1 micron which consists essentially of
   A. forming an aqueous solution consisting essentially of water and a precondensate of urea and formaldehyde
   B. mixing said aqueous solution with sulphamic acid at a temperature of from room temperature to 100° C to form a crosslinked gel, the pH during gel formation being from 1.0 to 1.6, and the molar ratio of formaldehyde to urea being from greater than 1.2 to 2.0 not later than at the time of gel formation, and
   C. comminuting, drying and deagglomerating the resulting gel.

2. A process as claimed in claim 1, wherein the aqueous solution of a precondensate is one obtained by precondensation of more than 1.2 mols of formaldehyde with 1 mol of urea.

3. A process as claimed in claim 2, wherein the aqueous solution of a precondensate is one obtained by precondensation of about 1.5 mols of formaldehyde with 1 mol of urea.

4. A process as claimed in claim 1, wherein the aqueous solution of a precondensate is one manufactured by precondensation of the reaction components in the pH range of 6 to 9 and in the temperature range of 40° – 100° C.

5. A process as claimed in claim 1, wherein the aqueous solution of a precondensate is one obtained by reaction of the reaction components over a period of time so chosen that while the bulk of the formaldehyde has reacted with the urea, the compatibility with water of the precondensate is nevertheless still sufficiently great to permit it to be homogeneously mixed with a solution of the sulphamic acid.

6. A process as claimed in claim 1, wherein the comminuted gel is freed of at least the bulk of the catalyst acid by washing with water and/or by treatment with alkali.

7. A process as claimed in claim 1, wherein the resulting gel, after comminution, is suspended in water, neutralized, dehydrated and finally deagglomerated.

8. A process as claimed in claim 1, wherein the dry polycondensation product is deagglomerated by means of a high speed pin mill.

* * * * *